United States Patent [19]
Fujii

[11] Patent Number: 5,397,871
[45] Date of Patent: Mar. 14, 1995

[54] LIGHT BEAM HEATING SYSTEM WITH INERT GAS SHIELD

[75] Inventor: Koji Fujii, Osaka, Japan

[73] Assignee: Matsushita Electric Industrial Co., Ltd., Kadoma, Japan

[21] Appl. No.: 252,068

[22] Filed: Jun. 1, 1994

Related U.S. Application Data

[63] Continuation of Ser. No. 959,677, Oct. 13, 1992, abandoned.

[30] Foreign Application Priority Data

Oct. 15, 1991 [JP]  Japan .................. 3-265851

[51] Int. Cl.6 .................. B23K 1/005; B23K 26/12
[52] U.S. Cl. .................. 219/85.12; 392/379; 392/419; 228/220
[58] Field of Search .................. 219/85.12, 85.13; 392/379, 419–421; 228/219, 220

[56] References Cited

U.S. PATENT DOCUMENTS

| | | | |
|---|---|---|---|
| 3,621,198 | 11/1971 | Herbrich | 219/85.12 |
| 3,649,811 | 3/1972 | Schoenthaler | 219/85.12 |
| 3,696,230 | 11/1972 | Friedrich | 219/121.75 |
| 3,710,069 | 1/1973 | Papadopoulos et al. | 219/85.12 |
| 3,864,547 | 2/1975 | Ray | 219/85.12 |
| 4,010,345 | 3/1977 | Banas et al. | 219/121.84 |
| 4,564,135 | 1/1986 | Barresi et al. | 228/219 |
| 4,606,493 | 8/1986 | Christoph et al. | 228/219 |
| 4,771,929 | 9/1988 | Bahr et al. | 219/85.12 |
| 4,787,548 | 11/1988 | Abbagnaro et al. | 228/6.2 |
| 5,054,106 | 10/1991 | Fortune | 392/476 |
| 5,196,667 | 3/1993 | Gammelin | 219/85.12 |

FOREIGN PATENT DOCUMENTS 61-0192185  8/1986  Japan .
900022785  1/1990  Japan .

*Primary Examiner*—Bruce A. Reynolds
*Assistant Examiner*—John A. Jeffery
*Attorney, Agent, or Firm*—Ratner & Prestia

[57] ABSTRACT

A light beam heating system is suited for use in performing local heating. The light beam heating system includes a light source for emitting light, an optical lens assembly for converging the light emitted from the light source on an object to be heated, and a gas cylinder for supplying shielding gas towards the object via a gas regulator, a gas valve, and a gas nozzle. During heating, the oxygen concentration of an atmosphere around the object is maintained to less than 5%. Preferably, the shielding gas is supplied to the object via a temperature regulator so that the shielding gas may be heated to a desired temperature prior to the heating of the object.

4 Claims, 3 Drawing Sheets

LIGHT BEAM HEATING SYSTEM WITH INERT GAS SHIELD

This application is a continuation of application Ser. No. 07/959,677 filed Oct. 13, 1992, now abandoned.

BACKGROUND OF THE INVENTION

1. Field of the Invention

The present invention relates generally to a light beam heating system capable of performing local heating by focusing light from a light source, and more particularly to a light beam heating system suited for use in manufacturing information or communication equipment, electronically controlled equipment, electronic components, transmission components, semiconductors or the like. In manufacturing this equipment or these components, a local soldering process is automated by the use of the light beam heating system according to the present invention.

2. Description of the Prior Art

Light beam heating systems are in wide practical use today as local heating systems without requiring physical contact. In the light beam heating systems, a xenon lamp or a YAG laser diode is generally utilized as a light source, and upon condensing light from the light source, an object to be heated is directly irradiated thereby. Prior to the condensing, the light from the light source may be introduced to a desired location via a light transmission means such as, for example, a fiber cable.

FIG. 1 schematically depicts a conventional light beam heating system wherein a light emitting portion of a lamp 1, for example a xenon lamp, is positioned at a first focal point 3 of an ellipsoidal reflector 2, which condenses light from the lamp 1. The light condensed by the reflector 2 is led to an object 5 to be heated via a light transmission means such as, for example, a fiber cable 6. To this end, the center of one end of the fiber cable 6 is positioned at a second focal point 4 of the reflector 2, and an optical lens assembly 7 for converging or focusing light transmitted by the fiber cable 6 on the object 5 is secured to the other end of the fiber cable 6. The use of the fiber cable 6 is to prevent light reflected by the reflector 2 from adversely affecting electronic components or the like disposed in the proximity of the second focal point 4 of the reflector 2. As a matter of course, the object 5 may be located at the second focal point 4 of the reflector 2 without using the fiber cable 6. The lamp 1 is operatively connected with a power circuit 8, which regulates an input current to the lamp 1, thereby controlling the intensity of light to be irradiated on the object 5.

In the above construction, when the lamp 1 is turned on, the lamp 1 emits light by a preset electric current applied thereto. The light from the lamp 1 is reflected by the reflector 2 and is introduced to the lens assembly 7 via the fiber cable 6. The light is then focused on the object 5 to heat it.

FIG. 2 schematically depicts another conventional light beam heating system having an optical mechanism 17 disposed on a light path between a lamp 1 and a second focal point of an ellipsoidal reflector 2. This light beam heating system is provided with no light transmission means, and the optical mechanism 17 is intended to convert light reflected from the reflector 2 into plural rays of light, which are in turn irradiated on desired points of an object 5 to be heated when a shutter 9 is open.

In the above-described conventional light beam heating systems, however, because the object 5 is heated in the atmosphere, the object 5 tends to be oxidized in the presence of oxygen in the atmosphere.

For example, if the object 5 is a leg of an electronic component, and if the electronic component is desired to be secured to a printed foil with the leg soldered to the component by the use of a soldering paste, the soldering paste often fails to sufficiently wet the leg and the printed foil, resulting in formation of solder balls. Where the amount of flux residue left on the printed circuit board after the soldering is to be minimized so that the use of a solvent such as, for example, flon can be dispensed with in cleansing the printed circuit board to eliminate the necessity of cleansing the printed circuit board, the heating of the soldering paste in the atmosphere often results in a failure of the printed circuit board to be wetted, accompanied by a formation of a substantial number of solder balls. Accordingly, the conventional light beam heating systems have unsolved problems, making it difficult to abolish the use of the solvent.

In any event, the conventional light beam heating system is, in most cases, used to accomplish a soldering of component parts to a printed circuit board after most of the component parts have already been mounted thereon. Accordingly, the heating of the soldering paste often results in the formation of the solder balls.

In order to reduce the length of time during which the heating is carried out, the intensity of light to be irradiated must be increased. However, the higher the light intensity, the more often the formation of the solder balls. Accordingly, the conventional light beam heating system requires a preheating of the object to be heated, rendering the apparatus as a whole to be high in manufacturing cost.

SUMMARY OF THE INVENTION

The present invention has been developed to overcome the above-described disadvantages.

It is accordingly an object of the present invention to provide an improved light beam heating system capable of preventing an object to be heated from being oxidized during heating, thereby preventing poor solder-wetting of the object or the formation of solder balls.

Another object of the present invention is to provide a light beam heating system of the above-described type of which the working efficiency is enhanced by making use of the preheating effect.

In accomplishing the above and other objects, a light beam heating system according to the present invention comprises a light emitting means for emitting light, a converging means for converging the light emitted from the light emitting means on an object to be heated, and a shielding gas supplying means for supplying shielding gas towards the object, thereby reducing the oxygen concentration of an atmosphere around the object to less than 5%.

Preferably, the light beam heating system according to the present invention further comprises a gas temperature regulating means for regulating the temperature of the shielding gas supplied from the shielding gas supplying means.

Inert gas, for example nitrogen gas, or reducing gas, for example nitrogen gas containing hydrogen of about 5% by volume, is preferably employed as the shielding gas.

According to the present invention, because the oxygen concentration of the atmosphere around the object is less than 5%, a heated or fused portion of the object undergoes little oxidation. Even if the object has undergone oxidation, an oxide can be readily removed therefrom. As a result, the heating can be carried out under a desired condition.

Furthermore, the use of the preheating effect enhances the working efficiency.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
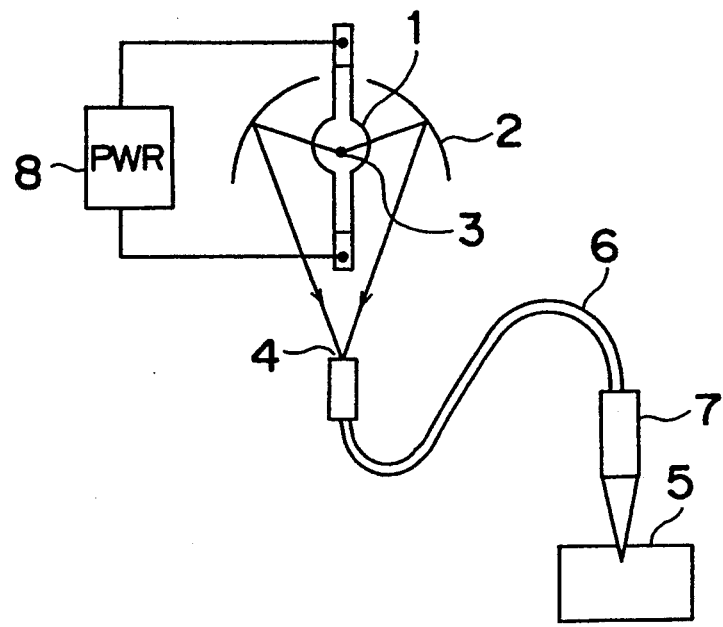
FIG. 1 is a schematic view of a conventional light beam heating system.
Figure 2:
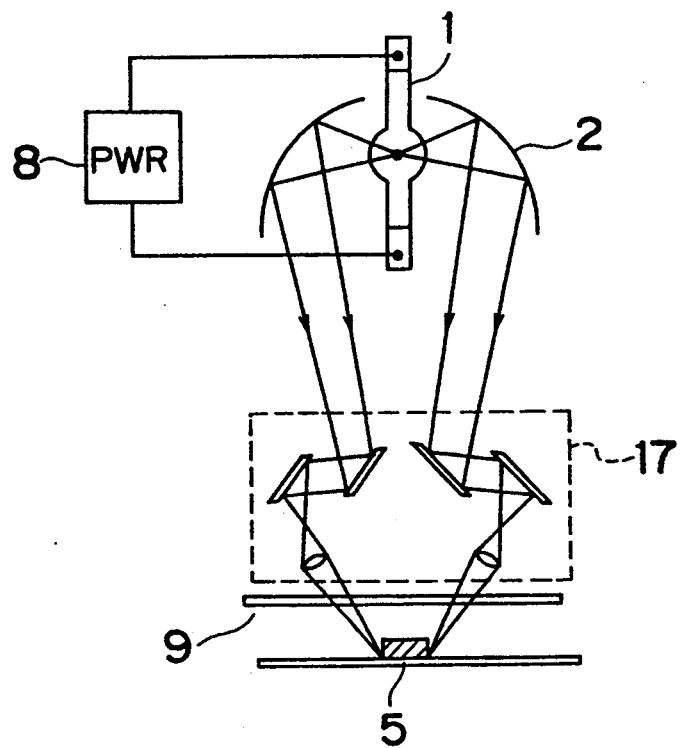
FIG. 2 is a schematic view of another conventional light beam heating system.
Figure 3:
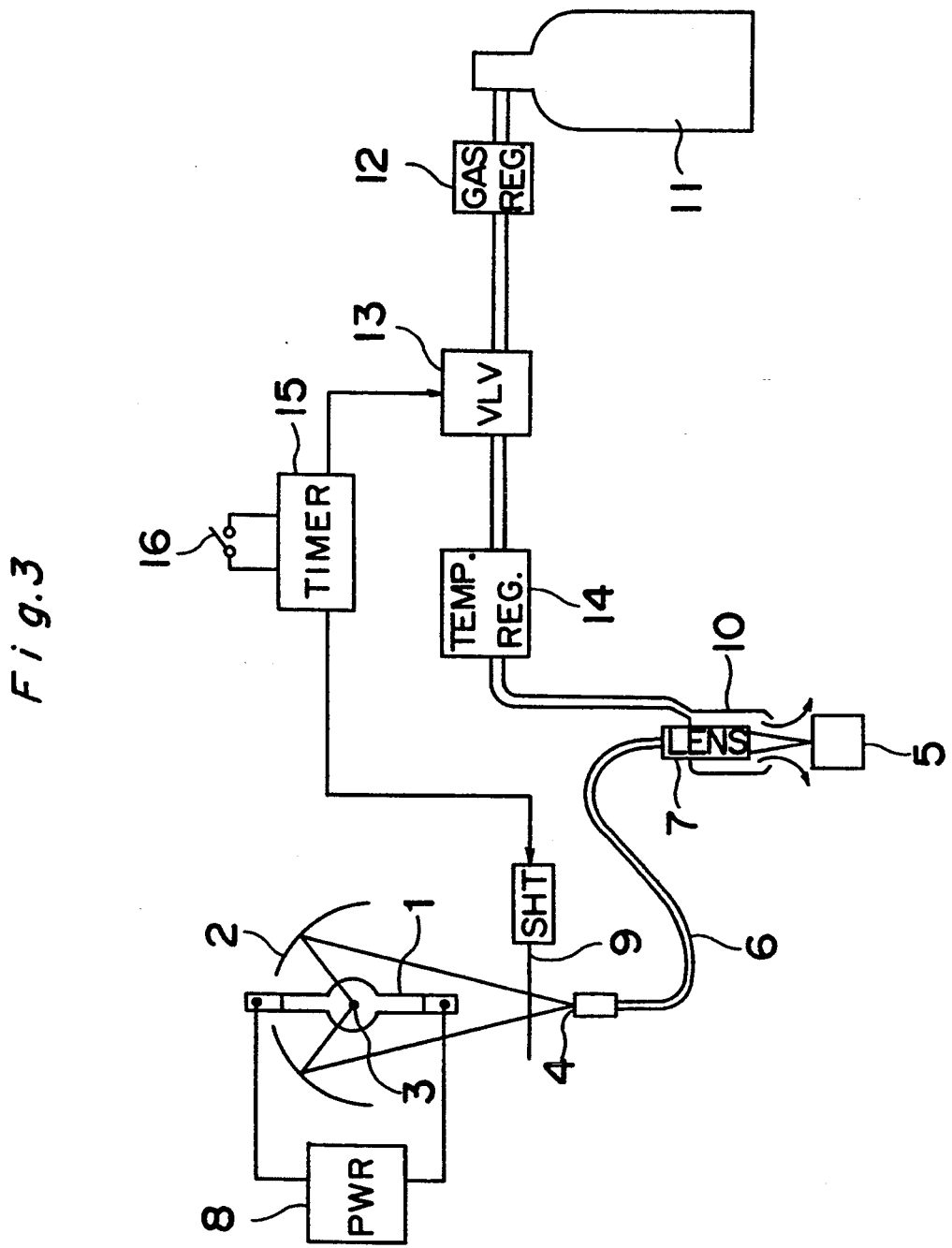
FIG. 3 is a schematic view of a light beam heating system according to a first embodiment of the present invention.

Referring now to the drawings, there is shown in FIG. 3 a light beam heating system according to a first embodiment of the present invention wherein light emitted from a lamp 1 such as, for example, a xenon lamp is reflected and condensed by an ellipsoidal reflector 2 and is focused on the center of one end of a fiber cable 6. A shutter 9 is reciprocally disposed in the course of a light path from the reflector 2 towards the fiber cable 6 to intercept the light from the reflector 2. A light emitting portion of the lamp 1 is positioned at a first focal point 3 of the reflector 2, whereas the center of one end of the fiber cable 6 is positioned at a second focal point 4 of the reflector 2. An optical lens assembly 7 is secured to the other end of the fiber cable 6 to focus light transmitted via the fiber cable 6 on an object 5 to be heated. The lamp 1 is operatively connected with a power circuit 8, which regulates an input current to the lamp 1, thereby controlling the intensity of light to be irradiated on the object 5. A gas nozzle 10 is formed around the lens assembly 7, and a shielding gas is introduced thereto from a gas cylinder 11 via a gas regulator 12, a gas valve 13, and a temperature regulator 14. The shielding gas discharged from an outlet of the gas nozzle 10 shields a portion of the object 5 which is to be soldered. The temperature regulator 14 is intended to control the temperature of the shielding gas to enhance the working efficiency in preheating or heating the object 5. The temperature regulator 14 is made of a heating member of which the temperature can be controlled. The shielding gas is heated by the heating member when passing it.

A timer circuit 15 is operatively connected with the shutter 9 and the gas valve 13 to open and close each of them according to the on-off state of an irradiation switch 16, thereby controlling the timing for irradiation and that for shielding.

The light beam heating system having the above-described construction operates as follows.

Light emitted from the lamp 1 is initially condensed by the reflector 2. When the shutter 9 is open, the light condensed by the reflector 2 enters the fiber cable 6 and is then irradiated on a soldering portion of the object 5 by means of the lens assembly 7. When the gas valve 13 is open, the shielding gas supplied from the gas cylinder 11 via the gas regulator 12 is discharged from the outlet of the gas nozzle 10 to shield the soldering portion of the object 5. At this moment, the temperature of the shielding gas is appropriately regulated by the temperature regulator 14.

More specifically, when the irradiation switch 16 is turned on, the timer circuit 15 opens the gas valve 13. Upon the lapse of a length of time set in advance by the timer circuit 15, the shutter 9 opens. As a result, the shielding gas appropriately heated by the temperature regulator 14 flows towards the soldering portion of the object 5 and reduces the oxygen concentration of an atmosphere around the soldering portion. Thereafter, the soldering is carried out. At this moment, if the temperature of the shielding gas has reached a high temperature by the operation of the temperature regulator 14, preheating of the soldering portion can also be carried out simultaneously. Inert gas such as, for example, nitrogen gas is preferably employed as the shielding gas. Alternatively, reducing gas such as, for example, nitrogen gas containing hydrogen of about 5% by volume is also used.

Figure 5:
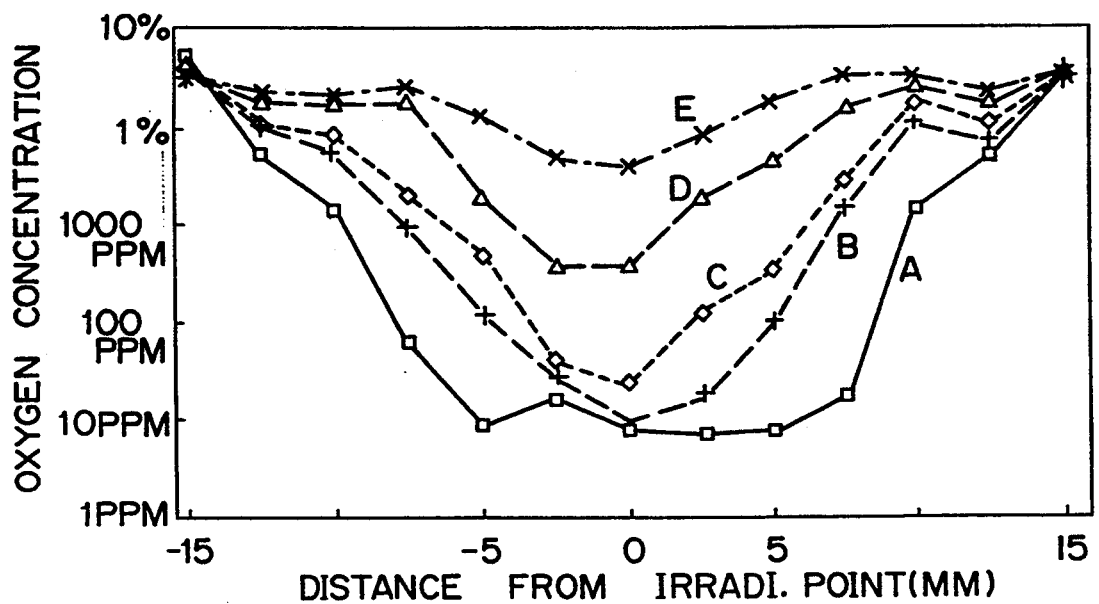
FIG. 5 is a graph indicating the shielding effect of a shielding gas around a portion of an object which is to be soldered.

FIG. 5 is a graph indicating the shielding effect of nitrogen gas at locations in the proximity of the soldering portion of the object 5. In FIG. 5, reference characters A, B, C, D, and E represent the cases where the spacing between the gas nozzle 10 and the object 5 is 5 mm, 8 mm, 10 mm, 15 mm, and 20 mm, respectively. In each case, the capacity of nitrogen contained in the shielding gas was 15 liters/min. It can be readily understood from this graph that, when the spacing between the gas nozzle 10 and the object 5 is less than 10 mm, the oxygen concentration of the atmosphere at a location within a radius of 5 mm from a light receiving portion of the object 5 is less than 100 PPM. When the oxygen concentration is less than 100 PPM, the shielding effect is deemed sufficiently good.

Figure 4:
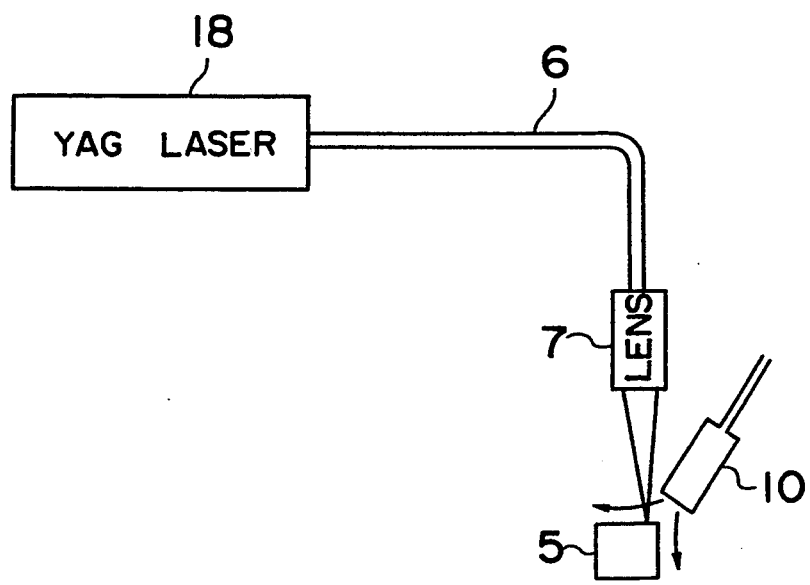
FIG. 4 is a schematic view of a light beam heating system according to a second embodiment of the present invention.

FIG. 4 depicts a light beam heating system according to a second embodiment of the present invention, which comprises a YAG laser diode 18, a fiber cable 6 connected at its one end with the YAG laser diode 18, an optical lens assembly 7 connected with the other end of the fiber cable 6, and a gas nozzle 10 which is to be positioned in the proximity of a light receiving portion of an object 5 to be heated. The timing for irradiation and that for shielding are the same as those in the system shown in FIG. 3.

According to the present invention, a portion of an object which is to be soldered is appropriately shielded by inert gas or reducing gas, and the oxygen concentration of an atmosphere around the soldering portion is reduced to less than 5%, thereby preventing the soldering portion from being oxidized during soldering and preventing poor solder-wetting of the soldering portion or the formation of solder balls resulting from the oxidation.

Furthermore, according to the present invention, not only can the necessity of cleansing printed circuit boards be eliminated, but also a soldering paste which reduces the amount of flux residue left on the printed circuit boards after the soldering can be used.

In addition, the use of the shielding gas heated by a temperature regulator can preheat the soldering portion, thereby enhancing the working efficiency.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A light beam heating system for heating a portion of an object comprising:

a light emitting means for emitting light;

a converging means for converging the light emitted from said light emitting means on the object;

a shielding gas supplying means for supplying shielding gas towards the object, thereby reducing the oxygen concentration of an atmosphere around the portion of the object to less than 5%; and a gas temperature heating means for heating said shielding gas supplied from said shielding gas supplying means independently of said light emitting means, said gas temperature heating means regulating the temperature of said shielding gas.

2. The light beam heating system according to claim 1, wherein said shielding gas is inert gas.

3. The light beam heating system according to claim 2, wherein said inert gas is nitrogen gas.

4. The light beam heating system according to claim 1, wherein said shielding gas supplying means has a gas nozzle spaced at most about 10 mm from the object.

* * * * *

UNITED STATES PATENT AND TRADEMARK OFFICE
CERTIFICATE OF CORRECTION

PATENT NO.    : 5,397,871
DATED         : March 14, 1995
INVENTOR(S)   : Fujii

It is certified that error appears in the above-identified patent and that said Letters Patent is hereby corrected as shown below:

Cover Page item [73] "Kadoma" should be --Osaka--.

Signed and Sealed this

Eleventh Day of July, 1995

Attest:

BRUCE LEHMAN

Attesting Officer        Commissioner of Patents and Trademarks